United States Patent
Pavao-Moreira et al.

(10) Patent No.: US 10,006,987 B2
(45) Date of Patent: Jun. 26, 2018

(54) RADAR DEVICE UTILIZING PHASE SHIFT

(71) Applicants: Cristian Pavao-Moreira, Frouzins (FR); Dominique Delbecq, Fonsorbes (FR); Birama Goumballa, Larra (FR)

(72) Inventors: Cristian Pavao-Moreira, Frouzins (FR); Dominique Delbecq, Fonsorbes (FR); Birama Goumballa, Larra (FR)

(73) Assignee: NXP USA, Inc., Austin, TX (US)

( * ) Notice: Subject to any disclaimer, the term of this patent is extended or adjusted under 35 U.S.C. 154(b) by 415 days.

(21) Appl. No.: 14/642,012

(22) Filed: Mar. 9, 2015

(65) Prior Publication Data

US 2016/0103206 A1    Apr. 14, 2016

(30) Foreign Application Priority Data

Oct. 8, 2014   (WO) .................. PCT/IB2014/002472

(51) Int. Cl.

| G01S 13/08 | (2006.01) |
|---|---|
| G01S 7/35 | (2006.01) |
| G01S 13/58 | (2006.01) |
| G01S 13/32 | (2006.01) |
| G01S 13/34 | (2006.01) |
| G01S 13/93 | (2006.01) |

(52) U.S. Cl.
CPC .............. *G01S 7/35* (2013.01); *G01S 7/354* (2013.01); *G01S 13/08* (2013.01); *G01S 13/325* (2013.01); *G01S 13/343* (2013.01); *G01S 13/345* (2013.01); *G01S 13/58* (2013.01); *G01S 13/931* (2013.01)

(58) Field of Classification Search
CPC .................................................... G01S 13/325

USPC .......................................................... 342/70
See application file for complete search history.

(56) References Cited

U.S. PATENT DOCUMENTS

| 3,942,178 A | 3/1976 | Hackett |
|---|---|---|
| 4,072,947 A * | 2/1978 | Johnson ................ G01S 13/345 342/103 |
| 5,012,253 A | 4/1991 | Schuster et al. |
| 6,795,006 B1 | 9/2004 | Delight et al. |
| 8,471,761 B1 * | 6/2013 | Hogg .................... G01S 13/0209 342/114 |
| 2003/0090405 A1 * | 5/2003 | Rauch ..................... G01S 7/038 342/21 |
| 2004/0051926 A1 | 3/2004 | Gulden et al. |
| 2010/0070550 A1 * | 3/2010 | Hein .................. H03H 17/0283 708/311 |

(Continued)

OTHER PUBLICATIONS

Extended European Search Report for Patent Appln. No. 15187515.0 (dated Mar. 15, 2016).

(Continued)

*Primary Examiner* — Vladimir Magloire
*Assistant Examiner* — Helena H Seraydaryan
(74) *Attorney, Agent, or Firm* — Charlene R. Jacobsen

(57) ABSTRACT

A radar device comprises at least one transmitter unit for transmitting a radar signal, at least one receiver unit for receiving a reflected radar signal, and a phase shift unit for producing a phase shift in the frequency modulated radar signal in response to a phase shift signal. The receiver unit comprises at least one filter unit for filtering the received signal and is arranged for resetting the filter unit in response to said phase shift signal, so as to avoid saturation of the filter unit due to the phase shift.

18 Claims, 5 Drawing Sheets

(56) References Cited

U.S. PATENT DOCUMENTS

2013/0293411 A1  11/2013  Dehlink et al.

OTHER PUBLICATIONS

Reynolds, L. et al; "Single Chip FMCW Radar for Target Velocity and Range Sensing Applications"; IEEE 11th Annual Gallium Arsenide Integrated Circuit Symposium; Technical Digest; pp. 243-246 (Oct. 22, 1989).

* cited by examiner

_US 10,006,987 B2_

RADAR DEVICE UTILIZING PHASE SHIFT

CROSS REFERENCE TO RELATED APPLICATION(S)

The present application claims priority to International Patent Application No. PCT/IB2014/002472, entitled "RADAR DEVICE UTILIZING PHASE SHIFT," filed on Oct. 8, 2014, the entirety of which is herein incorporated by reference.

FIELD OF THE INVENTION

This invention relates to a radar device in which a phase shift is utilized. More in particular, the present invention relates to a radar device comprising at least one transmitter unit and at least one receiver unit, in which the transmitter unit comprises a phase shift unit for producing a phase shift of the radar signal in response to a phase shift signal.

BACKGROUND OF THE INVENTION

Radar systems and devices are well known. A typical radar system transmits an electromagnetic signal and receives reflections of the transmitted signal. The time delay between the transmitted and received signals is indicative of the distance of objects causing the reflections.

In some radar systems, a phase shift (also referred to as phase rotation) is used. A phase shift of 90° may be used to better detect reflected signals in noise (quadrature detection), as disclosed in U.S. Pat. No. 3,942,178, for example. In U.S. Pat. No. 3,942,178, the phase-shifted transmitter signal is fed directly to the receiver but the transmitted signal is not phase-shifted.

A phase shift of 180° may be used to better distinguish reflected signals from transmitted signals. In radar systems using such a phase shift, the transmitted signal may be periodically phase shifted. The period is typically chosen such that the phase shift occurs between two time frames of the signal, thus altering the phase every time frame, where a time frame may, for example, correspond with a "chirp" in an FMCW (frequency modulation continuous wave) signal.

In radar receivers, high pass filters with low cut-off frequencies are often used to attenuate low frequency interferences, for example in automotive applications (the "bumper effect" caused by reflections from car bumpers). In addition, low pass filters may be used to limit the effective signal bandwidth to be converted by any analog-digital converters.

When shifting the phase of the transmitted signal, however, filters processing the received signal may go into saturation. This is not a problem if this occurs between time frames and if the filters are no longer in saturation when the next time frame starts. However, when a very short inter-frame period is used, the filters may still be in saturation when the next time frame starts, which will impede the proper functioning of the radar device.

SUMMARY OF THE INVENTION

The present invention provides a radar device, a vehicle radar system, an integrated circuit, a method of operating a radar device and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

In the following, for sake of understanding, the circuitry is described in operation. However, it will be apparent that the respective elements are arranged to perform the functions being described as performed by them.

Figure 1:
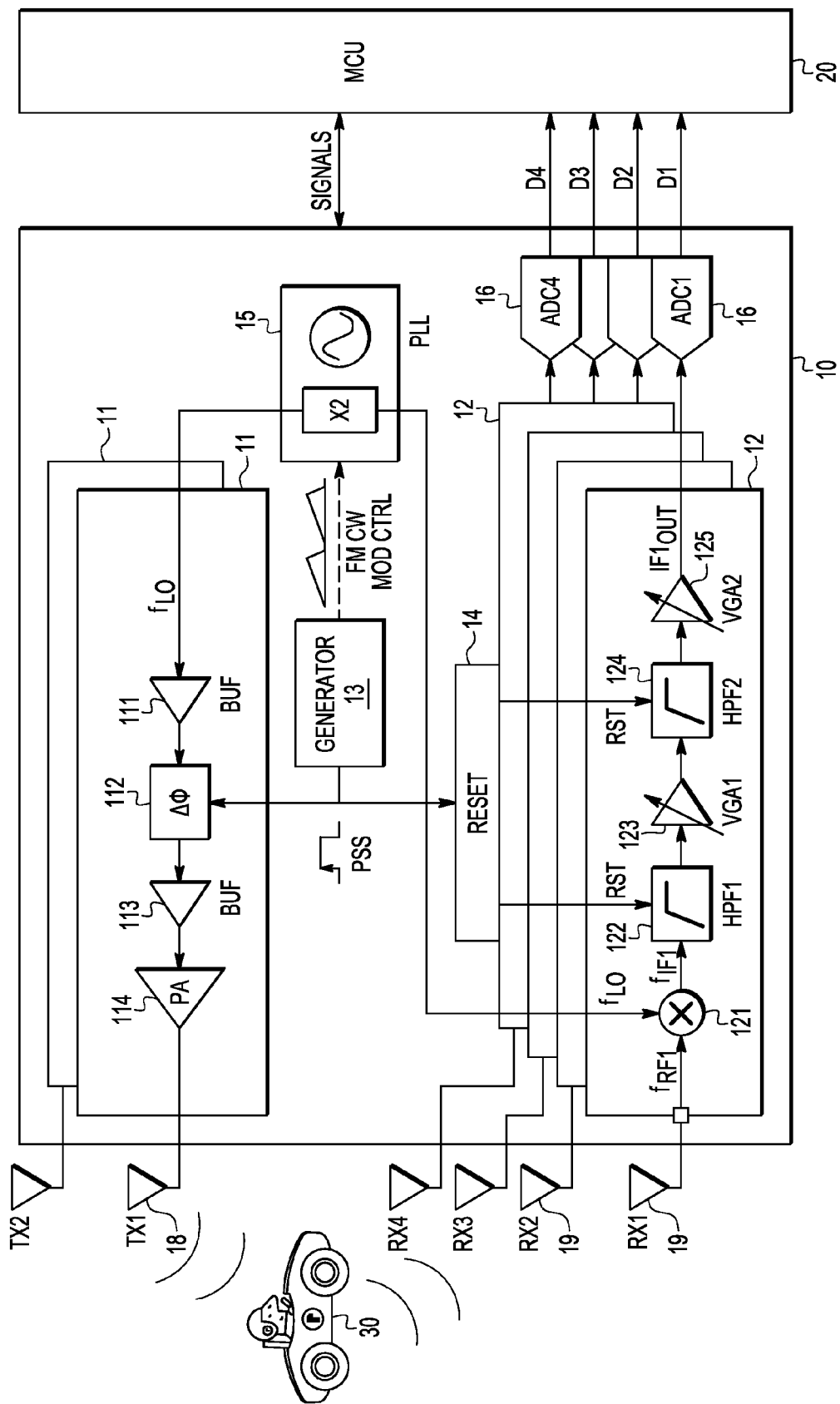
FIG. 1 schematically shows a first example of an embodiment of a radar device.

The radar device 10 illustrated merely by way of exemplary embodiment in FIG. 1 comprises transmitter units 11 and a receiver units 12. Although two transmitter units 11 and four receiver units 12 are shown in FIG. 1, these numbers are not limiting and other numbers are also possible, such as four transmitter units 11 and six receiver units 12, or a single transmitter unit 11 and/or a single receiver unit 12. The radar device 10 of FIG. 1 further comprises a phase shift signal generator 13, a reset control unit 14, a frequency synthesizer unit 15 and analog/digital (AD) converters 16.

The radar device shown in FIG. 1 further comprises a processing unit 20, which in the embodiment shown is constituted by a micro-processing unit (MCU). The processing unit 20 may be arranged for signal processing tasks such as, but not limited to, target identification, determination of target distance and target velocity, and generating control signals. The processing unit 20 may for example be configured for generating calibration signals, receiving data signals, receiving sensor signals, generating frequency spectrum shaping signals (such as ramp generation in the case of FMCW radar) and/or state machine signals for RF (radio frequency) circuit enablement sequences.

When the radar device is implemented as an integrated circuit, the actual radar device 10 and the processing unit 20 may be constituted by separate integrated circuits (chips). However, embodiments can be envisaged in which the actual radar device 10 and the processing unit 20 are implemented together in a single chip.

Figure 2:
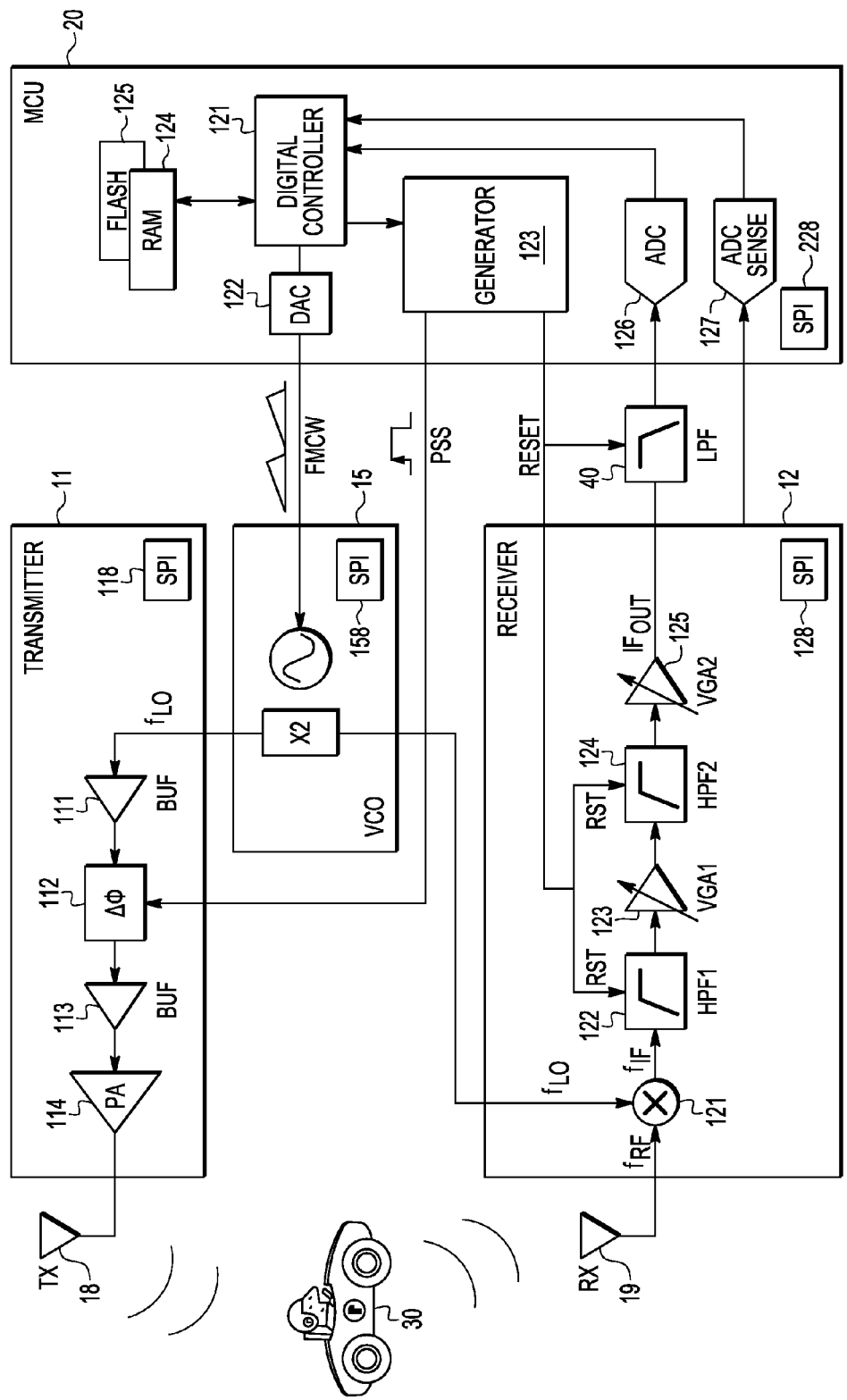
FIG. 2 schematically shows a second example of an embodiment of a radar device.
Figure 3:
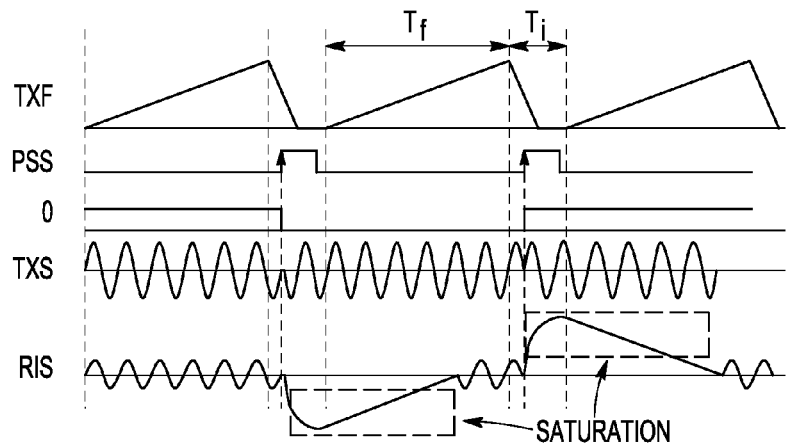
FIG. 3 schematically shows an example of a set of signals without filter reset.

The phase shift signal generator 13 is configured for repeatedly generating a phase shift signal PSS and may be synchronized with the frequency synthesizer unit 15 so as to produce a phase shift signal PSS between two time frames of the transmitter signal TXF, as illustrated in FIGS. 2 and 3. The frequency synthesizer unit 15 may comprise at least one oscillator, frequency dividers, frequency doublers, a phase comparator and/or a loop filter or any other phase locked loop (PLL) arrangement, which arrangements are well known in the art.

In the example shown, the transmitter units 11 receive an oscillator signal $f_{LO}$, generated by frequency synthesizer unit 15, at their input buffers 111. The signal $f_{LO}$ is then fed to a phase shift unit (or phase rotator) 112, which shifts the phase of the signal over certain (typically, but not necessarily, predetermined) number of degrees. In the example shown and as further explained with reference to FIGS. 2 and 3, the phase shift is 180° which is equivalent to $\pi$ radians. The timing of the phase shift $\Delta\phi$, as effected by the phase shift unit 112 in the receiver 11, is controlled by the phase shift signal PSS generated by the phase shift signal generator 13. This will later be further explained with reference to FIGS. 3 and 4.

The phase-shifted transmitter signal output by the phase shift unit 112 is fed to an output buffer 113 and from there to a power amplifier (PA) 114, which amplifies the signal to a level suitable for transmitting by a transmitter antenna unit 18.

The radar signal transmitted by the antenna units 18 may by reflected by an object, such as a vehicle 30. Part of the reflected radar signal reaches receiver antenna units 19. The received (radio frequency) antenna signal $f_{RF1}$ is fed to a mixer 121, where it is mixed with the oscillator signal $f_{LO}$, generated by the frequency synthesizer 15. The resulting intermediate frequency signal $f_{IF1}$ is fed to a first high-pass filter (HPF1) 122. The resulting filtered signal is fed to a first variable gain amplifier (VGA1) 123 which amplifies the signal before feeding it to a second high pass filter (HPF2) 124. This re-filtered signal is fed to a second variable gain amplifier (VGA2) 125, after which the signal is fed to an analog/digital converter (ADC) 16 and is output by each receiver unit 12 as a digital signal D1, D2, etc.

Although the transmitted radar signal may have a frequency which is constant, or at least constant during a certain time period, the frequency may also vary. In frequency modulated continuous wave (FMCW) systems, for example, the frequency varies during a time frame. Typically, the frequency of an FMCW system linearly increases (or decreases) during the active time frame. Between time frames, the frequency returns to an initial value.

This is schematically illustrated in FIG. 3, where the signal TXF represents the transmitter frequency as a function of time. The frequency can be seen to increase, during a time frame $T_f$, from an initial value to a higher, final value. In the time between time frames, the inter-frame period $T_i$, the frequency quickly returns to its original value. It will be understood that such a signal may be generated by an oscillator of the frequency synthesizer unit 15 of FIG. 1, and that for this purpose the oscillator may be constituted by a voltage-controlled oscillator or a digitally controlled oscillator, which are well known in the art.

In order to be able, at a receiver, to distinguish transmitted radar signals from reflected radar signals, the transmitted radar signals may be coded. A relatively simple way of coding is reversing the phase of the signal after each time frame $T_f$. It will be understood that other arrangements are also possible, for example reversing the phase every other time frame. In FIG. 3, the phase shift signal PSS is shown, which is provided by the generator 13 in FIG. 1. As can be seen, this phase shift signal PSS occurs relatively early in the inter-frame period $T_i$. Under control of the phase shift signal PSS, the phase $\phi$ of the signal is shifted (or "rotated"). In the example shown, the phase shift is 180°, although other phase shifts, such as 90°, are also possible. The transmitter signal TXS is shown to have a phase reversal synchronous with the phase shift signal PSS.

When this signal is reflected by an object, for example a vehicle 30 as illustrated in FIG. 1, and is received by a receiver, the phase shift may cause problems as the filters may be driven into saturation. The receiver intermediate signal (RIS) which occurs at the output of the filters 122 and/or 124 of FIG. 1 can be seen to deviate significantly from the transmitted signal TXS due to the saturation of the filters. This makes an accurate detection of the distance and/or velocity of an object very difficult, if not impossible.

Figure 4:
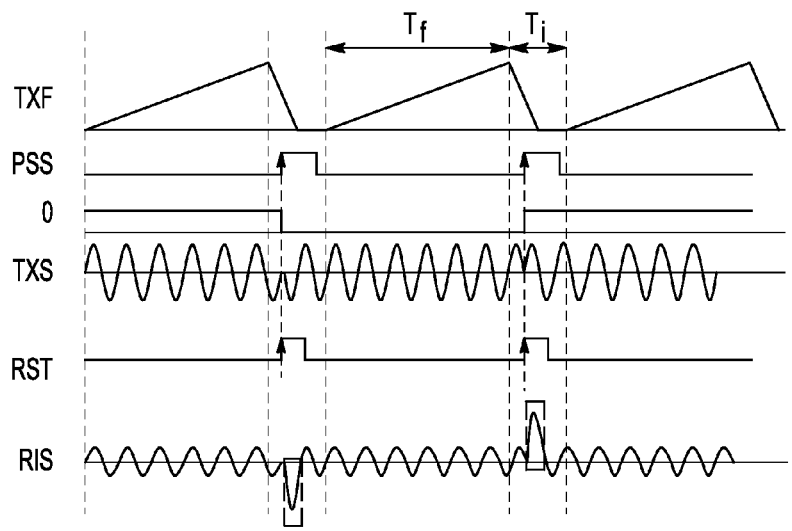
FIG. 4 schematically shows an example of a set of signals with filter reset.

The saturation of the filters is actively shortened by resetting the filters. This is achieved by feeding a reset signal RST to the filters, which reset signal is derived from the phase shift signal PSS. As can be seen in FIG. 4, which is similar to FIG. 3, the period during which the filters are in saturation is significantly shortened. What is more, the saturation ends well within the inter-frame period $T_i$. It would be possible to use longer inter-frame periods, thus allowing the filters more time to recover from the saturation state. However, this leaves the radar device inactive for too long; it is often desired to keep the inter-frame periods as short as possible.

Accordingly, by resetting the at least one filter unit in response to said phase shift signal, the saturation of the filter unit is almost instantaneously terminated, thus avoiding signal distortion in the receiver unit. If the radar signal consist of time frames between which a phase shift is carried out, the reset of the filter unit ensures that the filter unit is timely ready for the next time frame of the signal. In other words, the reset is carried out so as to suppress undesired filter states, such as saturation.

The reset signal RST may be identical to the phase shift signal PSS, or may be a processed version of the phase shift signal PSS, where the processing may for example involve a delay. It will be understood that in embodiments in which the reset signal RST is identical to the phase shift signal PSS and no time delay is applied, the reset unit 14 may only comprises through connections.

In the embodiment of FIG. 1, the phase shift signal PSS is fed to the reset unit 14. This reset unit 14 may pass the phase shift signal PSS to the filter units unaltered, or may change its duration and/or voltage, and/or may introduce a delay. Such a delay may serve to take the travel time of the radar signals, from the transmitting antennas via an object to the receiving antennas, into account.

An example of an alternative embodiment of a radar device is schematically illustrated in FIG. 2. This embodiment of the radar device 10 comprises a single transmitter unit 11, a single receiver unit 12 and a processing unit 20, although multiple transmitter and/or receiver units can also be envisaged. The embodiment of FIG. 2 is further shown to comprise an (optional) low-pass filter 40. The transmitter unit(s) 11, receiver unit(s) 12, frequency synthesizer unit 15 and (optional) low-pass filter 40 are preferably implemented on a single integrated circuit (chip) which may also comprise the processing unit (MCU) 20, although the processing unit 20 may alternatively be implemented on a second, separate integrated circuit which is suitable connected with the first integrated circuit.

In the exemplary embodiment of FIG. 2, the signal processing unit 20 is shown to comprise a digital controller 121, a digital-analog converter (DAC) 122, a generator 123, a random access memory (RAM), a flash memory 125, a first analog-digital converter (ADC) 126, a second analog-digital converter 127 and a serial port interface (SPI) 228. The first analog-digital converter 126 serves to digitize the output signals of the receiver 12, which in the present embodiment are additionally filtered by the low-pass filter 40 to limit the bandwidth of these signals. The second analog-digital converter 127 serves to digitize sense signals originating from sensors (not shown) in the transmitter unit(s) 11, the receiver unit(s) 12 and the frequency synthesizer unit 15.

It is noted that the processing unit 20 of FIG. 1 may also comprise some or most of the functions mentioned above, such as analog-digital converters. However, in the embodiment of FIG. 1 a generator 13 is provided as part of the actual radar device 10, whereas in the embodiment of FIG. 2 a generator 123 is shown to be part of the processing unit 20. The serial port interface (SPI) 228 of the processing unit 20 is an interface for managing registers which store data. Similar registers 118, 128 and 158 are shown to be present in the transmitter unit 11, the receiver unit 12, and the frequency synthesizer unit 15 respectively.

Figure 5:
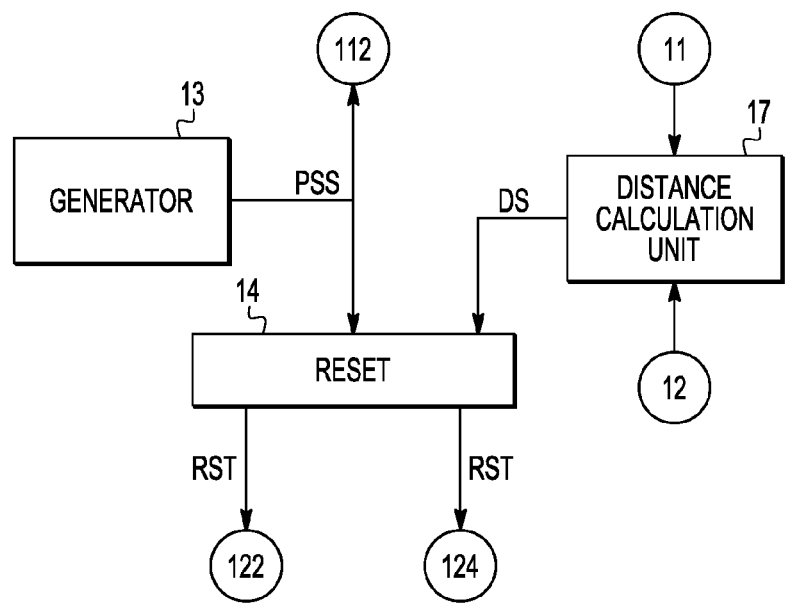
FIG. 5 schematically shows an example of part of an embodiment of a radar device.

FIG. 5 illustrates part of a radar device 10. The phase shift signal generator 13 is shown to produce the phase shift signal PSS, which is fed to the phase shift unit (112 in FIGS. 1 & 2). This signal is also fed to the reset unit 14, which produces reset signals RST which are in turn fed to the filters (122 and 124 in FIGS. 1 & 2). In the embodiment shown, the reset unit 14 also receives a distance signal DS, produced by a distance calculation unit 17. This distance calculation unit 17 receives signals from both the transmitter or transmitters (11 in FIGS. 1 & 2) and the receiver or receivers (12 in FIGS. 1 & 2) to calculate a distance, based on the time delay of the received signals. In some embodiments, the distance calculation unit 17 may also be arranged for calculating the (relative) velocity of the object. In other embodiments, the distance calculation unit 17 may only be arranged for calculating the (relative) velocity of the object, and may be referred to as velocity calculation unit. Determining the distance and (relative) velocity of an object using radar techniques is well known in the art and therefore requires no further explanation.

The reset unit 14 may use the distance and/or velocity information to determine a suitable delay for the reset signal. This delay may then be applied to the reset signal RST. In some embodiments, however, this delay may only be applied when this delay is not negligible compared with the inter-frame period $T_i$ (see FIG. 3). That is, very small distance-related delays may be neglected. The distance calculation unit 17 may be implemented as part of the actual radar device 10, or may be implemented as part of the processing unit 20.

The reset of the filters may be effected in several ways, for example by connecting a filter input to ground, or to a suitable voltage, using an electronic switch. Alternatively, or additionally, a capacitor of the filter may be short-circuited via a suitable resistor. Irrespective of the method employed, the reset will substantially remove the undesired effects of the phase shift. In the exemplary case of high-pass filters, the reset effectively reduces the low frequency components caused by the phase shift of the signal. It will be understood that resetting is not limited to high-pass filters but may also be applied to low-pass or band-pass filters.

Figure 6:
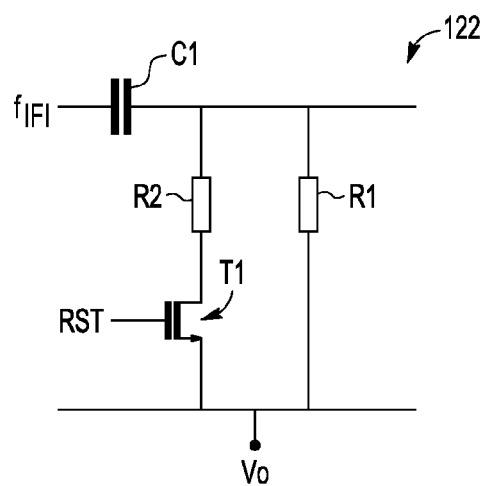
FIG. 6 schematically shows an example of an embodiment of a filter circuit.

An example of a filter circuit provided with a reset mechanism is schematically illustrated in FIG. 6. The exemplary filter circuit of FIG. 6 may correspond to the filter 122 and/or the filter 124 in FIGS. 1 & 2. The example shown is a high-pass filter implemented in hardware, but it will be understood that the same principles can be applied to a low-pass filter, or to a filter implemented in software.

The filter circuit shown comprises a capacitor C1 and a first resistor R1, which together constitute a high-pass filter. In the example of FIGS. 1 & 2, the signal having the intermediate frequency $f_{IF1}$ is fed to the filter 122. A reset circuit comprises a second resistor R2 and a transistor T1, which in the example shown is a FET (Field Effect Transistor). Normally, the transistor T1 is not conducting, as a result of which no current will flow through the resistor R2 and the transistor T1, and the normal functioning of the filter circuit is not affected. However, when the signal RST goes high, as illustrated in the example of FIG. 3, the transistor T1 starts conducting, thus connecting the output of the capacitor C1 to the voltage $V_0$, via the resistor R2 and the transistor T1. It is noted that the second resistor R2 preferably has a resistance which is significantly lower than the resistance of the first resistor R1 and may even have a resistance substantially equal to zero. It is further noted that the voltage $V_0$ is a suitable voltage, for example ground.

It will be understood that resetting filters is known per se. U.S. Pat. No. 6,795,006 (Delight et al.), for example, discloses an integrator (that is, a low-pass filter) with a reset mechanism. U.S. Pat. No. 6,795,006 is herewith in its entirety incorporated by reference in this document.

Figure 7:
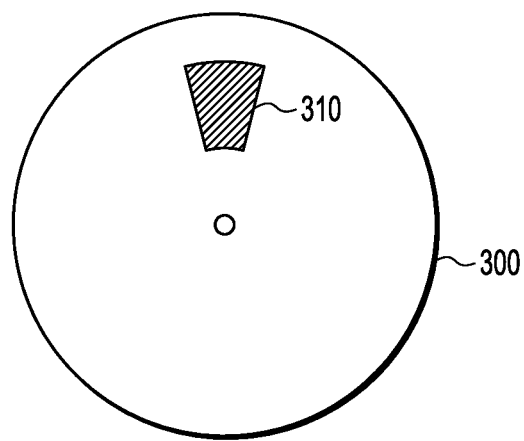
FIG. 7 shows a computer readable medium comprising a computer program product.

A merely exemplary non-transitory tangible computer readable storage medium 300 is schematically illustrated in FIG. 7. The storage medium 300 may be a CD or DVD as illustrated, but may also be constituted by a memory stick, for example. The storage medium contains instructions 310 which allow a processor to carry out the method of operating a radar device as defined herein. More in particular, the instructions allow a processor to carry out a method of operating a radar device comprising at least one transmitter unit for transmitting a radar signal, at least one receiver unit for receiving a reflected radar signal, the receiver unit comprising at least one filter unit for filtering the received signal, and a phase shift unit for producing a phase shift in the radar signal in response to a phase shift signal, the method comprising providing a reset of the at least one filter unit in response to said phase shift signal.

The invention may therefore also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. FIG. 7 shows a computer readable medium 300 comprising a computer program product 310, the computer program product 310 comprising instructions for causing a processor apparatus to perform a method of operating a radar device, the method comprising providing a reset of the at least one filter unit in response to said phase shift signal so as to suppress undesired filter states. The computer program product 310 may be embodied on the computer readable medium 300 as physical marks or by means of magnetization of the computer readable medium 300. However, any other suitable embodiment is conceivable as well. Furthermore, it will be appreciated that, although the computer readable medium 300 is shown in FIG. 7 as an optical disc, the computer readable medium 300 may be any suitable computer readable medium, such as a hard disk, solid state memory, flash memory, etc., and may be non-recordable or recordable. The computer readable medium may be a non-transitory tangible computer readable storage medium.

In summary, a radar device is provided, comprising at least one transmitter unit for transmitting a radar signal, at least one receiver unit for receiving a reflected radar signal, the receiver unit comprising at least one filter unit for filtering the received signal, and a phase shift unit for producing a phase shift in the radar signal in response to a phase shift signal, the receiver unit being arranged for providing a reset of the at least one filter unit in response to said phase shift signal so as to suppress undesired filter states. An undesired filter state may be, but is not limited to, saturation of the filter unit due to the phase shift.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections. However, other modifications, variations and alternatives are also possible. The specifications and drawings are, accordingly, to be regarded in an illustrative rather than in a restrictive sense.

Although the examples have been described with reference to FMCW radar, other types of radar may also be used. Furthermore, although the examples are described in the context of vehicle radar systems, these may also be applied to aircraft radar, bicycle radar, patient monitoring systems, etc. Devices functionally forming separate devices may be integrated in a single physical device. Also, the units and circuits may be suitably combined in one or more semiconductor devices. That is, the radar device may be implemented as a single integrated circuit, or as multiple integrated circuits.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

It will therefore be understood by those skilled in the art that the present invention is not limited to the embodiments described above and that many additions and modifications are possible without departing from the scope of the invention as defined in the appending claims.

The invention claimed is:

1. A radar device, comprising:
at least one transmitter unit for transmitting a radar signal;
at least one receiver unit for receiving a reflected radar signal, the receiver unit comprising at least one filter unit for filtering the received signal;
a phase shift signal generator for generating a phase shift signal during an inter-frame period between consecutive time frames of the radar signal; and
a phase shift unit for producing a phase shift in the transmitted radar signal in response to the phase shift signal, wherein the at least one filter unit is reset in response to said phase shift signal to shorten a saturation period of the at least one filter unit caused by the phase shift such that the saturation period ends within the inter-frame period.

2. The radar device according to claim 1, arranged for introducing a delay in the reset of the at least one filter unit.

3. The radar device according to claim 2, arranged to determine a distance to a target, and wherein the delay is varied in dependence on said distance.

4. The radar device according to claim 2, arranged to determine a velocity of a target, and wherein the delay is varied in dependence on said velocity.

5. The radar device according to claim 2, wherein the delay is a fixed delay.

6. The radar device according to claim 1, wherein the phase shift is an 180 degree phase shift.

7. The radar device according to claim 1, wherein the transmitter unit is arranged for varying, during time frames, the frequency of the radar signal between an initial value and a final, different value, and for producing the phase shift and the reset between the time frames.

8. The radar device according to claim 1, arranged for frequency modulation continuous wave radar.

9. The radar device according to claim 1, comprising at least two transmitter units and at least two receiver units.

10. The radar device according to claim 1, further comprising a microcontroller unit.

11. An integrated circuit comprising a radar device according to claim 1.

12. A vehicle radar system, comprising at least one transmitter antenna, at least one receiver antenna, and a radar device according to claim 1.

13. A method of operating a radar device comprising:
transmitting a radar signal with a transmitter of the radar device;
receiving a reflected radar signal of the transmitted radar signal with a receiver of the radar device, the receiver comprising at least one filter unit for filtering the received reflected radar signal;
generating a phase shift signal during an inter-frame period between consecutive time frames of the radar signal with a phase shift signal generator of the radar device;
producing a phase shift in the transmitted radar signal in response to the phase shift signal with a phase shift unit of the radar device; and
resetting the at least one filter unit in response to said phase shift signal to shorten a saturation period of the at least one filter unit caused by the phase shift such that the saturation period ends within the inter-frame period.

14. The method according to claim 13, further comprising introducing a delay in the reset of the at least one filter unit.

15. The method according to claim 14, further comprising determining a distance to a target, and varying the delay in dependence on said distance.

16. The method according to claim 14, further comprising determining a velocity of a target, and varying the delay in dependence on said velocity.

17. The method according to claim 14, wherein the delay is a fixed delay.

18. The method according to claim 13, further comprising varying, during time frames, the frequency of the radar signal between an initial value and a final, different value, and for producing the phase shift and the reset between the time frames.

\* \* \* \* \*